United States Patent [19]

Long, Jr.

[11] Patent Number: 5,358,359
[45] Date of Patent: Oct. 25, 1994

[54] APPARATUS FOR EVERTING A TUBE

[75] Inventor: Charles A. Long, Jr., Birmingham, Ala.

[73] Assignee: Insituform (Netherlands) B.V., Netherlands

[21] Appl. No.: 54,307

[22] Filed: Apr. 30, 1993

[51] Int. Cl.⁵ ............................................. F16L 55/165
[52] U.S. Cl. ..................................... 405/154; 138/97;
156/294; 405/156; 405/150.1
[58] Field of Search ...................... 405/146, 150.1, 154,
405/156, 184; 138/97; 156/287, 294, 423

[56] References Cited

U.S. PATENT DOCUMENTS

| | | |
|---|---|---|
| 4,009,063 | 2/1977 | Wood . |
| 4,064,211 | 12/1977 | Wood . |
| 4,135,958 | 1/1979 | Wood . |
| 4,668,125 | 5/1987 | Long, Jr. . |
| 4,685,983 | 8/1987 | Long, Jr. . |
| 4,770,562 | 9/1988 | Müller ................................. 405/154 |
| 5,108,533 | 4/1992 | Long, Jr. et al. . |
| 5,154,936 | 10/1992 | Driver et al. . |

FOREIGN PATENT DOCUMENTS

WO92/14961  9/1992  PCT Int'l Appl. .

Primary Examiner—David H. Corbin
Attorney, Agent, or Firm—James & Franklin

[57] ABSTRACT

In a tube eversion apparatus having a chamber in which eversion pressure is produced, that pressure is controllably sealed by providing curtain means communicating with the chamber through which the eversion tube slides and by providing inflatable means, preferably one on each side of the curtain means, which when inflated is caused to press against the curtain means, thereby to press the curtain means against the eversion tube sliding therethrough so as to produce the seal which maintains the eversion pressure in the chamber. A pair of sets of such inflatable means may be mounted on the apparatus one above the other with the individual sets of inflatable means being individually controlled, thus producing not only redundancy of the sealing means but also permitting enlarged or discontinuous portions of the eversion tube assembly to pass through the sealing means without interfering with the seal produced thereby. The inflatable means are mounted on the apparatus in an exposed position, facilitating repair and replacement.

28 Claims, 3 Drawing Sheets

APPARATUS FOR EVERTING A TUBE

BACKGROUND OF THE INVENTION

The present invention relates to an apparatus for everting a flexible tube liner into the interior of a conduit or pipe, such as a previously existing underground sewer pipe.

One of the more successful pipe repair or rehabilitation processes which is currently used is called the Insituform Process and is described in U.S. Pat. No. 4,009,063, Wood; 4,064,211, Wood, and 4,135,958, Wood, the contents of which are incorporated herein by reference. The method of eversion of a flexible liner as set forth in U.S. Pat. No. 4,064,211 usually required a twenty to thirty foot scaffold to support a vertical flexible tube and connecting pipes that would provide the necessary hydraulic pressure to evert a flexible liner. A number of self-contained, transportable apparatus that used self-erecting tubes and conveyors have been developed, some of which are disclosed in U.S. Pat. No. 4,668,125, Long, Jr., and U.S. Pat. No. 4,685,983, Long, Jr. Recently, U.S. Pat. No. 5,154,936, Driver et al., disclosed an apparatus that everts a flexible tube liner into the interior of a pipe or conduit by an apparatus that is made up of two pipe chambers defining two pressure regions separated by a sphincter-type valve that utilizes a pressure chamber and utilizes external air pressure to cause a flexible tube to impinge upon the flexible liner, resulting in a seal which allows the flexible liner to slide through. The use of this apparatus has been successful. However, the total size and weight of the unit sometimes presents a problem. Since the eversion tube assembly that must pass through the sphincter valve usually includes a bulky or otherwise discontinuous portion, as where the tube itself is connected to a hold-back line and a lay-flat hose which must also sealingly slide through the valve, the passage of that bulky portion through the valve without losing the sealing effect of the valve presents a very real problem. In addition, since in the apparatus of U.S. Pat. No. 5,154,936 the chamber which develops the pressure exerted on the sphincter valve comprises an outer portion defined by the overall rigid structure of the apparatus, the flexible portion of the sphincter valve is relatively inaccessible, making repair or replacement of the sphincter valve a major, and therefore expensive, operation.

SUMMARY OF THE INVENTION

The present invention overcomes many of the difficulties inherent in the prior art installation apparatus by providing a self-contained mobile apparatus for everting a flexible liner into the interior of a conduit or pipe that is lightweight and relatively inexpensive to build, and easy to maintain and repair. To that end the eversion tube is caused to slide through a flexible curtain means on its way to the chamber where the eversion pressure is produced, and the apparatus is provided with inflatable means effective when inflated to press against the curtain means and sealingly press the curtain means against the eversion tube sliding therethrough. Preferably the inflation means utilizes a pair of opposed flexible tubular bladders associated with adjustably positionable deflection devices, thereby to provide ready control of the intensity of the seal between the curtain means and the eversion tube sliding therethrough. While a single set of such inflatable means can be utilized, it is preferred to provide two such sets, spaced one above the other and individually inflation-controlled, thereby to provide redundancy of seal if that is desired but, more importantly, to provide means whereby a larger or discontinuous portion of the eversion tube assembly can pass through the sealing apparatus without adversely affecting either the movement of the eversion tube assembly or the seal that is produced. This latter is accomplished by normally utilizing only the lower of the two sets of inflatable means to produce the desired seal, but when the enlarged or discontinuous portion of the eversion tube assembly passes through the upper uninflated inflatable means and reaches the space between the two sets of inflatable means the upper set is inflated to produce a seal and the lower set is deflated, thus permitting the enlarged or discontinuous portion of the eversion tube assembly to slide freely through that lower set of now deflated inflatable means without hindrance, while the upper and inflated set of inflatable means continues to produce the desired seal.

It is the prime object of the present invention to devise an apparatus which facilitates tube eversion by providing and maintaining effective eversion pressure by means of a structure which is comparatively light and therefore less costly, and in which the means provided for maintaining the eversion pressure is highly effective, readily adaptable to different operating requirements, and so constructed as to facilitate the repair and replacement of the mechanism which produces the seal.

It is a further object of the present invention to provide eversion apparatus which has the advantages of the apparatus disclosed in Driver et al. U.S. Pat. No. 5,154,936 but which is less bulky and expensive and which is capable of greater flexibility in use.

BRIEF DESCRIPTION OF THE DRAWINGS

To the accomplishment of the above, and to such other objects as may hereinafter appear, the present invention relates to the structure of a tube eversion apparatus as defined in the appended claims and as described in this specification, taken together with the accompanying drawings in which:

Figures 1, 2:
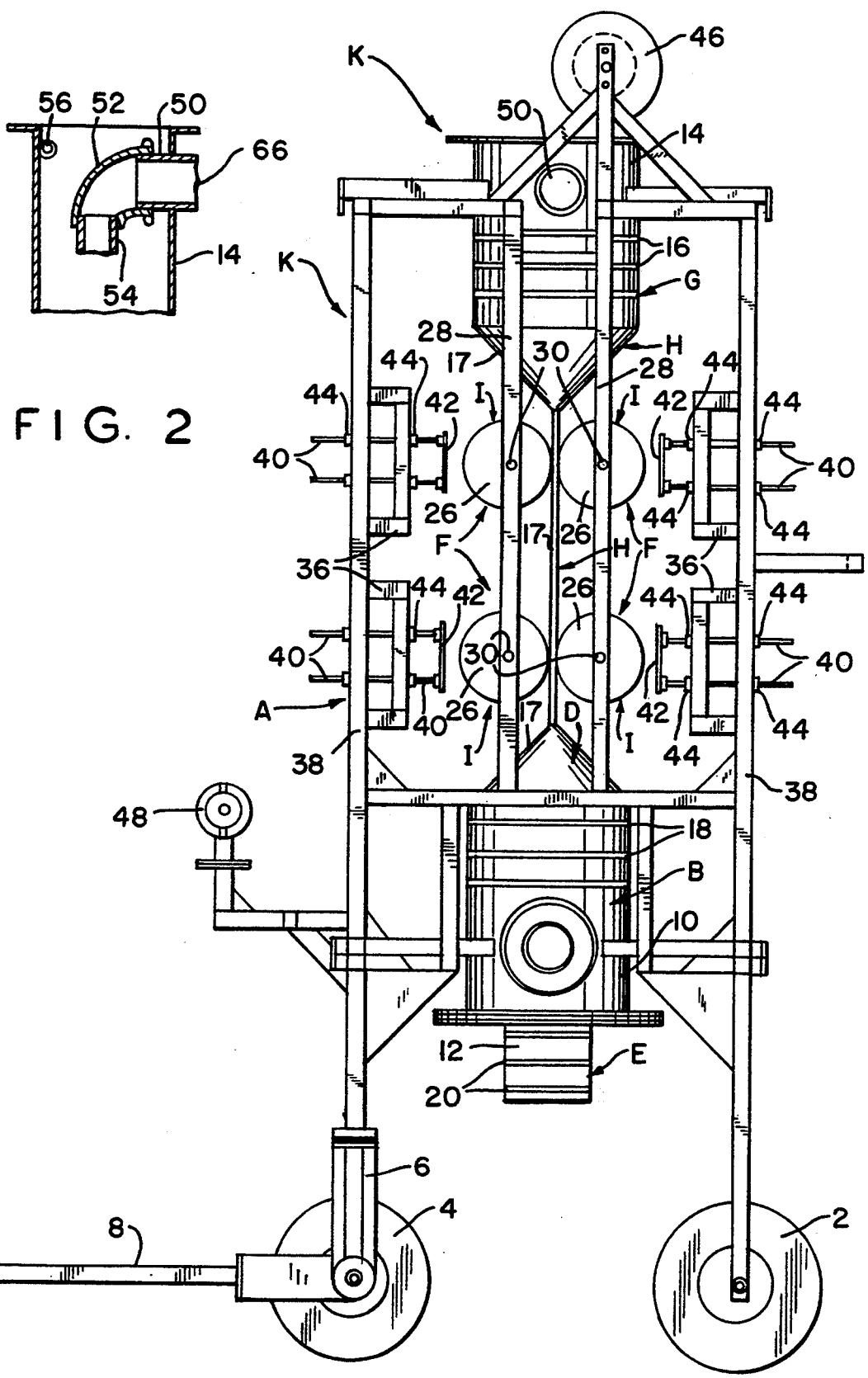
FIG. 1 is a side elevational view of a transportable liner eversion apparatus in accordance with the present invention, the apparatus being shown in standby condition.
FIG. 2 is a fragmentary cross-sectional view of a portion of the uppermost chamber of the disclosed apparatus.

The apparatus generally designated K comprises a framework generally designated A for supporting the operative structural elements, that framework preferably being readily transportable so that it can be moved from one place of work to another, and to that end it is provided with rear support wheels 2 and a front steering wheel 4, the front steering wheel 4 being mounted in a bracket 6 mounted on the framework A so as to be rotatable about a vertical axis, the bracket 6 being provided with a forwardly extending pull rod 8, thereby to facilitate steered movement of the apparatus K from one location to another. Mounted on the framework A is a first chamber generally designated B within which the pressure for everting an eversion tube, generally designated C, is developed. That chamber B has an inlet generally designated D through which the eversion tube C passes into the chamber B, and an outlet generally designated E through which the eversion tube C passes out from the chamber B in the course of its eversion. Located upstream of the inlet D is valving means generally designated F through which the eversion tube C slides, that valving means F producing a fluid seal effective to maintain the fluid eversion pressure developed in the chamber B. Preferably the apparatus comprises a second chamber generally designated G located upstream of the valving means F through which the eversion tube C also passes, the second chamber G functioning to assist in maintaining the seal produced by the valving means F. The general arrangement of parts as thus generally described is similar to that shown in Driver et al. U.S. Pat. No. 5,154,936, the basic difference between the instant disclosure and that of the said Driver patent relating to the structure and mode of operation of the valving means F.

The chamber B is defined by a generally cylindrical metal wall 10 having a depending generally cylindrical portion 12 which defines the chamber outlet E. It is mounted, as is conventional, on the lower portion of the framework A. The second chamber G is formed of a comparable substantially cylindrical metal wall 14 which is mounted on an upper portion of the framework A above the chamber B. The chamber B is open at its top, that defining inlet D thereto. The chamber G is open at the top and bottom. Extending between the chambers B and G is a flexible curtain means generally designated H, preferably in the form of a tubular fabric 17, the upper end of which is slid over and sealed to the lower end of the wall 14 and the lower end of which is slid over and sealed to the upper end of the wall 10. It may be formed of conventional flexible hose material such as may be used for fire hose. Its upper end is sealed to the wall 14 by banding clamps 16, while its lower end is sealed to the wall 10 by banding clamps 18. The interior of the tubular fabric 17 is preferably internally coated with a low-friction material such as polyurethane so as to facilitate the sliding of the eversion tube C therethrough, and it may also be externally coated with a similar material in order to enhance its strength and reliability.

As is conventional, the leading end of the eversion tube C, after it is passed through the chamber B and out through the outlet E, is cuffed back over the wall 12 and sealingly secured in place by the banding clamps 20, so that the fluid pressure developed in the chamber B will act only on the interior of the eversion tube C, thereby to cause it to evert. That will occur only if the fluid pressure developed in chamber B is prevented from escaping through the chamber outlet D. It is to prevent such fluid pressure escape that the valving means F is provided.

That valving means F is defined, in the preferred embodiment here disclosed, by a pair of opposed inflatable means generally designated I, one on each side of the tubular fabric 17 defining the curtain means H. Each inflatable means comprises a flexible bladder 24 (see FIGS. 3 and 4) extending horizontally between and sealed to a pair of bladder holders 26, the bladder holders 26 being mounted on pairs of vertical struts 28. The bladders 24 may be formed of conventional lay-flat hose material comparable to that forming the tubular fabric 17. The ends of the bladders 24 are sealed to the bladder holders 26 by pulling over the latter and being sealed thereagainst by clamping rings 32. One or more of the bladder holders 26 may be pierced by a tube 34 which is sealingly attached by welding through which fluid may be forced into the associated bladder 24 to inflate it. The opposite bladder holder 26 has a holding rod 30 welded to it. The pair of opposed inflatable means I is held in place by inserting holding rod 30 and tube 34 into holes that have been drilled into the opposing vertical struts 28. Mounted on the framework A opposite each of the inflatable means I is a bracket 36 mounted on vertical structural elements 38, that bracket 36 slidably receiving rods 40 the inner ends of which carry plate 42. The rods 40 are adjustably positionable laterally, toward and away from the inflatable means I, as by being externally threaded and cooperating with nuts 44, thereby to adjustably position the plate 42 relative to the bladder 24 with which it is associated. In FIG. 1 the plates 42 are shown in a withdrawn standby position. When the apparatus is to function, and as shown in FIG. 4, they are moved in toward the curtain means H so as to press the non-inflated bladders 24 against or almost against the curtain means H (see the upper pair of bladders 24 in FIG. 4).

Mounted on the framework A above the open top of the chamber G is a rotatable guide roller 46. Also mounted on the framework A is a control manifold assembly 48 having two separated sections 48a and 48b, for air and water respectively.

The wall 14 defining the chamber G is provided on its inside (see FIG. 2) with a side pipe opening 50 to which a 90° elbow 52 is adapted to be connected by a quick-connect device such as a cam-lock fitting, and a lay-flat hose connection 54 extends therefrom. A ring 56 is welded to the inside of the wall 14.

Figure 3:
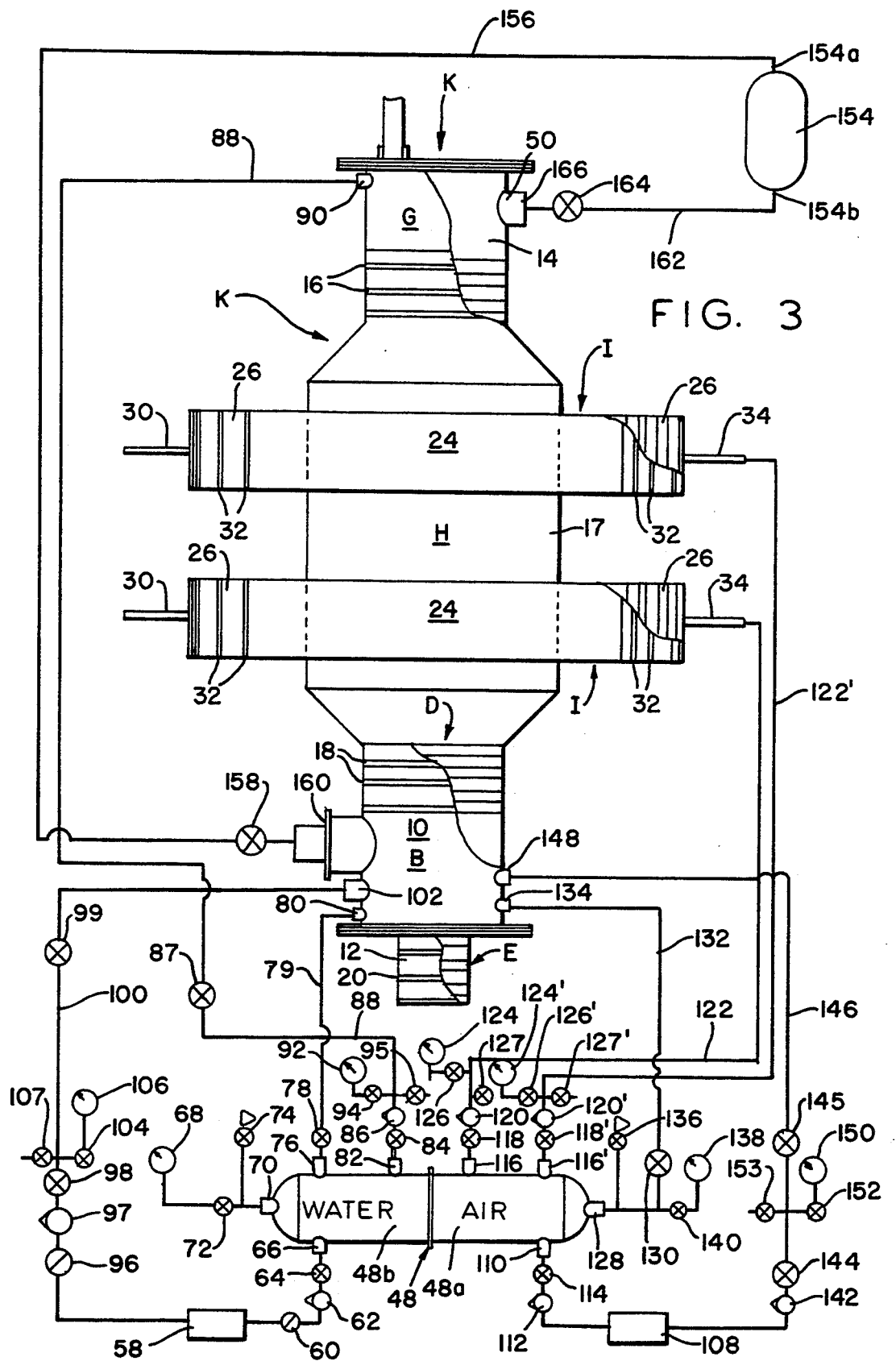
FIG. 3 is a diagrammatic representation of the piping, valves, hose and fittings involved in the use of the disclosed apparatus.
Figure 4:
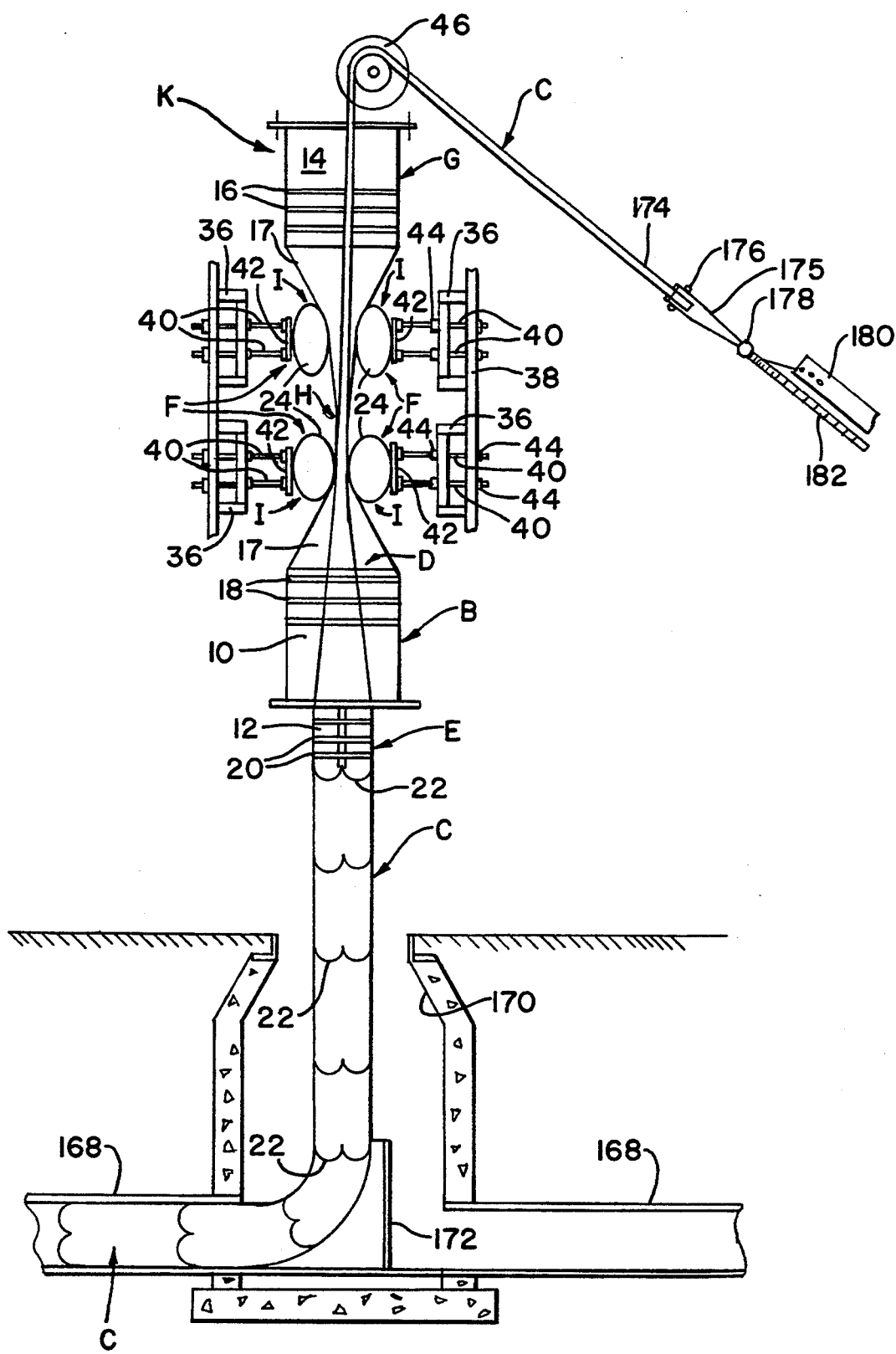
FIG. 4 is a semi-diagrammatic representation illustrating the manner in which the apparatus may be used.

FIG. 3 discloses one way in which the apparatus of the present invention can be used in conjunction with both air and water to perform its desired function. A pressurized cold water source 58 is connected via check valve 60, water pressure regulating valve 62 and valve 64 to an inlet 66 to the water chamber 48b of the manifold 48. Water pressure gauge 68, designed to indicate the pressure in the water chamber 48b, is connected to inlet 70 to the water chamber 48b by valve 72, water pressure relief valve 74 also being connected to the inlet 70. Outlet 76 from the chamber 48b is connected via valve 78 and pipe 79 to an inlet 80 to the chamber B. Another outlet 82 from the water chamber 48b is connected by valve 84, water pressure regulating valve 86 and valve 87 to line 88 which goes to an inlet 90 to the chamber G. Water pressure gauge 92 is connected via valve 94 to the line 88, and waste valve 95 is also connected to line 88. Pressurized cold water source 58 is also connected to check valve 96, water regulating valve 97, valve 98, quick-acting valve 99 and line 100 which is in turn connected to inlet 102 to the chamber B. Also connected to the line 100 is valve 104 and water pressure gauge 106, as well as waste valve 107.

The air pressure portion of the illustrated apparatus has a pressurized air source 108 connected to an inlet 110 to the air manifold chamber 48a via air pressure regulating valve 112 and valve 114. An outlet 116 from the air chamber 48a is connected via valve 118, air pressure regulating valve 120 and line 122 to the tubes 34 constituting the air inlets to the lowermost bladders 24 comprising the lowermost inflatable means I. An air pressure gauge 124 is connected to line 122 via valve 126, and waste valve 127 is also connected to line 122. Connections similar to those to the lowermost pair of inflatable means I but going to the uppermost pair of inflatable means I are identified by similar numbers, differentiated, however, by being primed.

Another outlet 128 from the air chamber 48a is connected via valve 130 to line 132 which leads to inlet 134 to the chamber B. An air pressure relief valve 136 is connected as shown, and an air pressure gauge 138 is connected to the line 132 via valve 140. The pressurized air source 108 is connected to air pressure regulating valve 142, valve 144, quick-acting valve 145 and line 146 which goes to inlet 148 to the chamber B. An air pressure gauge 150 is connected by valve 152 to line 146, and a waste valve 153 is also connected to the line 146.

The suction side 154a of water boiler 154 is connected via line 156 and valve 158 to an outlet 160 from the chamber B. The pressure side 154b of the boiler 154 is connected by line 162 and valve 164 to inlet 166 to the chamber G.

FIG. 4 illustrates one way in which apparatus K of the present invention will be used. An existing sewer pipe 168 to be lined has manhole 170 providing access thereto and it is through that manhole 170 that the eversion tube C is adapted to pass in order to enter and extend along the length of the sewer pipe 168 to be lined, here shown as extending to the left of manhole 170. In the form here specifically disclosed and as described in the prior art patents previously referred to, the eversion tube C may comprise a tube formed of felt impregnated with a thermosetting resin, the tube being adapted to be everted into the sewer pipe 168, then to be pressed outwardly by means of fluid pressure to engagement with the inner surface of the sewer pipe 168, after which the resin-impregnated felt is set, usually by the application of heat. Both sets of valving means F have their pair of opposed inflatable means I relaxed and non-inflated. The leading end of eversion tube C is passed over rotatable guide roller 46, down through apparatus K and out of cylindrical metal wall 12 of first chamber B. At this time the elbow 52 and hose connection 54 are not in place. The leading end of eversion tube C is manually everted (turned inside out), causing eversion tube C to have an everted face 22, and placed over cylindrical metal wall 12 and sealingly secured to the outer surface of metal wall 12 using banding clamps 20. Valve 114 is opened placing 20 psi of air pressure, as indicated by air pressure gauge 138, on air section 48a of control manifold assembly 48. Valves 118 and 118' are opened placing 10 psi of air pressure, as indicated by air pressure gauges 127 and 127', on the upper and lower pair of inflatable means I. The upper and lower plates 42 are adjusted using threaded rods 40 and threaded nuts 44 to cause plates 42 to laterally push against the round surface of the upper opposed inflatable means and the lower pair of opposed inflatable means I causing them to assume an ovaloid shape as shown in FIG. 4. The inflatable means I now impinge against the outer surface of flexible curtain H, which causes the inner surface of flexible curtain H to seal against the outer surface of eversion tube C. The inflatable bladders 24 of the upper pair of opposed inflatable means I are then deflated, as a result of which they tend to take up a relaxed cross-sectional shape, in which condition they only loosely engage the flexible curtain H, so that the eversion tube C is either unhindered or not hindered to any appreciable degree as it passes between the flexible bladders 24 of the upper pair of opposed inflatable means I. The flexible bladders 24 of the lower pair of opposed inflatable means I remain inflated and provide a sliding valving means F between the inside surface of flexible curtain H and the outer surface of eversion tube C as eversion tube C slides through flexible curtain H. As shown diagrammatically in FIG. 4, the inflated bladders 24 will spread out between the curtain means H and the plates 42 which, in operative position, confine the bladders 24 between themselves and the curtain means H, the inflated bladders 24 expanding laterally but preferably still retaining a non-circular flattened cross-sectional shape, thereby to engage the curtain means H and press it against the eversion tube C over an appreciable area.

Valve 64 is opened placing 20 psi of water pressure on water section 48b of control manifold assembly 48. Valve 84 is opened and water, at 10 psi of water pressure, is allowed to pass through line 88 until first chamber B, flexible curtain H and second chamber G of apparatus K are filled with water. Valve 84 is then closed. A small amount of vegetable oil may be manually added to second chamber G to provide additional lubrication to valving means F.

The process of everting the eversion tube C into sewer pipe 168 is started by opening valve 98; water pressure gauge 106 will indicate 30 psi of water pressure. Quick-operating valve 99 is slowly opened so that water pressure is exerted against the initially everted face 22 of eversion tube C, forcing that tube to continue to evert in a downward direction, as indicated schematically in FIG. 4, until its eversion face 22 reaches turning shoe 172 and thereafter continues eversion essentially horizontally through the sewer pipe.

The eversion process is continued until the trailing end 174 of eversion tube C closely approached the inflated lower pair of opposed inflatable means I, at that point having passed below the upper pair of inflatable means I. A hold-back clamp 176 which has a cable connection 175 and ring 178 has been previously installed on the trailing end 174 of eversion tube C. A detailed description of hold-back clamp 176 and its components is set forth in U.S. Pat. No. 4,776,370, Long, Jr. Lay-flat hose 180 and hold-back rope 182 are securely attached to ring 178. The eversion process is preferably stopped by closing quick-acting valve 99. Valve 118' is opened which places 10 psi of air pressure, as indicated by air pressure gauge 124', on the upper flexible bladders 24 of upper pair of opposed inflatable means I. Thus upper valving means F is activated. Lower valving means F is deactivated by closing valve 118 and opening waste valve 127 to release the air pressure until air pressure gauge 124 indicates 0 psi air pressure, after which waste valve 127 is closed. The process of the everting of eversion tube C is continued, using upper valving means F until the hold-back clamp 176, lay-flat hose 180 and hold-back rope 182 are well below the lower valving means F. The process of everting eversion tube C may then be stopped by closing quick-acting valve 99, the lower valving means F may be activated and the upper valving means F deactivated as previously described. Whether that is done, or whether eversion is continued with only the lower valving means F operative, an effective seal against the eversion tube C remains in effect, but the hold-back clamp 176, cable connection 175 and ring 178 have been passed below lower valving means F without loss of eversion fluid pressure on the eversion tube C. Having two sets of pairs of opposed inflatable means I, one above the other, also provides redundancy in the event of a failure of either of the dual bladder assemblies.

In the event the process of everting eversion tube C cannot be completed by using water pressure alone as the everting force, pipe line 146 and its components provide the ability to use a 60 psi boost of air pressure to assist in the process of everting eversion tube C. In addition, pipe line 79 and its components provide a redundant means of maintaining temporary water everting pressure until repairs can be made to pipe line 100 and its components.

After the eversion of the tube C into the sewer pipe 168 is complete, an appropriate portion of hold-back rope 182 is passed through the ring 56 and tied. Valve 118 is closed and waste valve 127 is opened until air pressure gauge 124 indicates 0 psi air pressure. Thus the lower pair of inflatable means I is deflated and lower valving means F is relaxed. With both upper valving means F and lower valving means F relaxed, lay-flat hose 180 is unobstructed and free to deliver a full volume of hot water for the curing process. The lay-flat hose 180 is also cut and its end is banded to connection 54 and to 90° pipe elbow 52 with cam-lock connections which at this point has been quick-connected to inlet 66 (see FIG. 2), which in turn communicates with inlet 166 and is thus connected, via valve 164 and pipe line 162, to the pressure side 154b of water boiler 154. The suction side 154a of the boiler 154 is connected by pipe line 156, a valve 158 and inlet 160 to the chamber B. Thus hot water is forced through holes in the lay-flat hose 180 the free end of which is now at the far end of the fully everted eversion tube C within the sewer pipe 168, that hot water circulates back through the everted tube C to the chamber B, and from there, via open valve 158 and line 156, goes back to the suction side 154a of the boiler 154 to be reheated and recirculated. This circulation of hot water is continued until the impregnating resin has cured.

After the curing process is complete, the hold-back rope 182 and the lay-flat hose 180 are separated from the ring 178, those elements having been connected thereto in such a fashion that disengagement can readily be effected, in a manner well known in the art, and the hold-back rope 182 and lay-flat hose 180 are pulled back through the manhole 170. Since the lining installation is now complete, the apparatus K is then converted to its movable state and is moved to the next jobsite.

From the above description, it can be seen that the present invention provides a simplified, self-contained, transportable apparatus for everting a flexible liner into the interior of a conduit or pipe, in which apparatus an effective sliding seal against the eversion tube is effected by apparatus which is simple and sturdy, capable of ready modification to adapt to different operating conditions, as by varying fluid pressures and adjusting the positions of the plates 42 with respect to their associated bladders 24, the actuating portions of the valving means F are simple and sturdy yet readily accessible for repair or replacement and by using a pair of separated inflatable means abnormalities or irregularities in the element which slides through the valve may be accommodated readily and without adversely affecting the seal that is produced.

While but a single embodiment of the present invention has been here specifically disclosed, it will be apparent that many variations may be made therein, all within the scope of the present invention as defined in the following claims.

I claim:

1. In apparatus for everting a tube comprising a support, a chamber mounted on said support having an inlet through which said eversion tube is adapted to pass to enter said chamber and having an outlet through which said eversion tube is adapted to pass to leave said chamber, means for developing fluid under pressure in said chamber for everting said eversion tube, and valving upstream from said chamber inlet through which said eversion tube passes, said valving permitting said eversion tube to slide therethrough while maintaining said fluid pressure in said chamber, the improvement which comprises curtain means mounted on said support sealed to and extending upstream of said chamber inlet through which said eversion tube is adapted to slide, inflatable means so mounted on said support adjacent said curtain means that when said inflatable means is inflated it presses against said curtain means and causes said curtain means to substantially fluid-sealingly press against said eversion tube and when said inflatable means is not inflated said curtain means is not thus pressed against said eversion tube, and means active on said inflatable means for inflating the latter.

2. The apparatus of claim 1, in which said curtain means extends in a given direction and said inflatable means extends substantially at right angles thereto.

3. The apparatus of either of claims 1 or 2, in which there are two of said inflatable means and associated structural means, said curtain means being located between said inflatable means.

4. The apparatus of either of claims 1 or 2, in which said inflatable means is mounted on said support between a pair of opposed holders to which the ends of said inflatable means are secured, said holders being mounted on said support so as to be exposed outside said chamber and said curtain means, whereby said inflatable means is accessible for ready replacement on said holders.

5. The apparatus of either of claims 1 or 2, in which said inflatable means is mounted on said support between a pair of opposed holders to which the ends of said inflatable means are secured, said holders being mounted on said support so as to be exposed outside said chamber and said curtain means, whereby said inflatable means is accessible for ready replacement on said holders, and in which said inflating means communicates with the interior of said inflatable means via one or more of said holders.

6. The apparatus of either of claims 1 or 2, in which said curtain means is internally covered with a low-friction material.

7. The apparatus of either of claims 1 or 2, in which said curtain means is internally coated with a polyurethane material.

8. The apparatus of either of claims 1 or 2, in which said curtain means is externally coated with a strength-giving material.

9. The apparatus of either of claims 1 or 2, in which said curtain means is externally coated with a polyurethane material.

10. The apparatus of either of claims 1 or 2, in which said structural means comprises a body on the other side of said inflatable means from said curtain means and engageable by said inflatable means when the latter is inflated, said body being mounted on said support so as to be adjustably positionable toward and away from said inflatable means.

11. The apparatus of claim 1, in which said apparatus comprises two sets of inflatable means and associated structural means, one set being closer to said chamber than the other with a space therebetween, and means for individually controlling the inflation of said inflatable means sets.

12. The apparatus of claim 11, in which said curtain means extends in a given direction and said inflatable means extends substantially at right angles thereto.

13. The apparatus of claim 11, in which each set of inflatable means comprises two of said inflatable means and associated structural means, said curtain means being located between said inflatable means.

14. The apparatus of any of claims 11, 12 or 13, in which said structural means comprises a body on the other side of said inflatable means from said curtain means and engageable by said inflatable means when the latter is inflated, said body being mounted on said support so as to be adjustably positionable toward and away from said inflatable means.

15. The apparatus of either of claims 1 or 11, in which such apparatus comprises a second chamber spaced above said first-mentioned chamber, said second chamber having an outlet through which said eversion tube is adapted to pass before it enters said first chamber, said curtain means being secured to and extending between said outlet of said second chamber and said inlet of said first-mentioned chamber.

16. The apparatus of claim 15, in which said curtain means is tubular.

17. Apparatus for everting a tube comprising a support, a first chamber mounted on said support having an outlet to which an end of a tube to be everted may be secured, said chamber having an inlet, the eversion tube being adapted to pass into said chamber via said inlet and to be everted from said chamber via said outlet, means on said support above and spaced from said chamber for guiding said eversion tube to said chamber inlet, and valving means on said support active on said eversion tube as it moves toward said chamber inlet, said valving means permitting said eversion tube to slide therethrough while maintaining fluid pressure in said chamber, and means for developing fluid under pressure in said chamber for everting said eversion tube, said valving means comprising curtain means sealingly connected to and extending upward from said chamber inlet through which said eversion tube is adapted to slide, inflatable bladder means mounted on said support so as when inflated to engage and push said curtain means against said eversion tube sliding therethrough, thereby to seal the inlet of said chamber against escape of fluid pressure while permitting said eversion tube to continue to slide along said curtain means, and means active on said bladder means for inflating the latter.

18. The apparatus of claim 17, in which there are two of said inflatable bladder means mounted on said support with said curtain means located between said bladder means.

19. The apparatus of either of claims 17 or 18, in which said curtain means is internally coated with a low-friction material.

20. In the apparatus of either of claims 17 or 18, structural means comprising a body on the other side of said bladder means from said curtain means, said body being mounted on said support so as to be adjustably positioned toward and away from said bladder means and engaged by said bladder means when it is inflated, thereby to control the action of said inflated bladder means on said curtain means.

21. The apparatus of claim 20, in which said curtain means is internally coated with a low-friction material.

22. The apparatus of claim 17, in which said bladder means is mounted between a pair of opposed bladder holders, said holders being mounted on said support so as to be exposed outside said chamber and said curtain means, whereby said bladder means is accessible for ready replacement.

23. The apparatus of claim 17, in which said bladder means is mounted between a pair of opposed bladder holders, said holders being mounted on said support so as to be exposed outside said chamber and said curtain means, whereby said bladder means is accessible for ready replacement, and in which said inflating means communicates with the interior of said bladder means via one or more of said holders.

24. The apparatus of claim 17, in which said apparatus comprises two sets of inflatable means, one set being closer to said chamber than the other with a space therebetween, and means for individually controlling the inflation of said inflatable means sets.

25. The apparatus of claim 24, in which each set of inflatable means comprises two of said inflatable means and associated structural means, said curtain means being located between said inflatable means.

26. The apparatus of either of claims 24 or 25, in which said structural means comprises a body on the other side of said inflatable means from said curtain means and engageable by said inflatable means when the latter is inflated, said body being mounted on said support so as to be adjustably positionable toward and away from said inflatable means.

27. The apparatus of either of claims 17 or 18, in which said curtain means is tubular.

28. The apparatus of claim 17, in which said apparatus further comprises a second chamber spaced above said first chamber, said second chamber having an outlet through which said eversion tube is adapted to pass, said curtain means being secured to and extending between said outlet of said second chamber and said inlet of said first chamber.

* * * * *